United States Patent [19]

Hutai

[11] 3,881,760
[45] May 6, 1975

[54] BUMPER FOR MOTOR VEHICLES

[75] Inventor: Hubert Hutai, Grafenau-Datzingen, Germany

[73] Assignee: Daimler-Benz Aktiengesellschaft, Stuttgart, Germany

[22] Filed: Feb. 15, 1974

[21] Appl. No.: 443,098

[30] Foreign Application Priority Data
Feb. 15, 1973 Germany............................ 2307330

[52] U.S. Cl.................................. 293/99; 293/86
[51] Int. Cl........................................ B60r 19/06
[58] Field of Search............ 293/70, 85, 86, 87, 99, 293/DIG. 2; 267/31, 32; 188/321; 248/358 AA

[56] References Cited
UNITED STATES PATENTS
1,377,816  5/1921  Drumb................................. 293/99
1,839,015  12/1931  Deveaux............................. 293/87
2,510,963  6/1950  Dibblee............................. 248/358

*Primary Examiner*—James B. Marbert
*Assistant Examiner*—Robert Saifer
*Attorney, Agent, or Firm*—Craig & Antonelli

[57] ABSTRACT

A bumper for motor vehicles, especially passenger motor vehicles which is retractable under energy-absorption in case of impact by means of shock absorbers that extend in the vehicle longitudinal direction and are rigidly connected with the vehicle body or the like; the fastening of the bumper takes place thereby at least at one shock absorber under interposition of an approximately bipole-shaped upright flat spring which yields in the vehicle cross direction while the shock absorbers are provided with fastening means within the open area of the shock absorber guide tube, by means of which is realized a support at the vehicle body or the like.

16 Claims, 3 Drawing Figures

BUMPER FOR MOTOR VEHICLES

The present invention relates to a bumper for motor vehicles, especially for passenger motor vehicles, which in case of an impact is retractable under energy-absorption by means of shock absorbers extending in the vehicle longitudinal direction and fixedly connected with the body or frame.

With such a shock absorber arrangement, there always exists the danger of a canting or edging between the piston shaft and the guide tube of the shock absorber since in case of a collision, as a rule also force components directed obliquely to the retraction direction of the shock absorber occur or an eccentric loading takes place. Though there exists the possibility to counteract this danger by a particularly strong construction of the shock absorbers pivotally connected in an appropriate manner, such structural parts are expensive in the manufacture and are very heavy.

It is the aim of the present invention to provide a shock absorber retractable under energy-absorption in case of an impact which can be equipped with the hitherto customary shock absorbers that are relatively simple in construction. Furthermore, the thus-constructed shock absorber is to be provided with an installation which, in case of an oblique impact or of an eccentric load keeps the forces not directed in the axial direction of the shock absorbers far-reachingly away from the shock absorbers.

Accordingly, a bumper for motor vehicles, especially for passenger motor vehicles is proposed which in case of an impact is retractable under energy absorption by means of shock absorbers extending in the vehicle longitudinal direction and fixedly connected with the vehicle body or the like, whereby according to the present invention, the fastening of the bumper takes place at least at one shock absorber under interposition of an upright flat spring bent approximately dipole-shaped and yielding in the vehicle cross direction, and whereby the shock absorbers include a fastening means within the open area of the shock absorber guide tubes, by way of which takes place a support at the body.

It is thus achieved that the forces directed in the vehicle cross direction are absorbed by the flat spring or springs. As a result of the elimination of the generally customary shock absorber fastening at the closed end of the guide tube and of the selection of a fastening and mounting similar to the one described in the U.S. Pat. No. 2,635,838, one becomes far-reachingly independent of the length of the shock absorber guide tube. As a result of the shorter cantilever length of the shock absorber, a better moment introduction takes place in by-passing the danger of a canting. Finally, the selected form of the flat spring and the arrangement thereof contributes decisively to the fact that a yieldingness of the shock absorber in the vehicle cross direction is achieved by means of a simple and light-weight structural part whereas the flat spring transmits forces directed in the vehicle longitudinal direction like a rigid body.

In one preferred embodiment of the present invention, the fastening possibility is constructed respectively as a flange formed out of the shock absorber guide tube which, for example, is inserted into an aperture or an opening of a vehicle cross bearer and is suitably connected with the same.

According to a further feature of the present invention, the two near legs of the flat spring may be brought into abutment at the forward end of the shock absorber shaft preferably by threaded connections, and the two remote legs of the flat spring may be detachably connected with the top and bottom side of the bumper.

It is particularly advantageous if the flat spring consists of a spring band whose starting and end area, disposed one above the other, is fixed at the bumper simultaneously with the fastening of the flat spring.

Damages of the bumper can be avoided if the latter is provided with an elastic bumper strip and/or bumper guards.

Accordingly, it is an object of the present invention to provide a bumper for motor vehicles, especially for passenger motor vehicles, which avoids by simple means the aforementioned shortcomings and drawbacks encountered in the prior art.

Another object of the present invention resides in a bumper for motor vehicles which eliminates the danger of canting between piston shaft and guide tube of the shock absorber in case of a collision involving forces having force components directed transversely to the longitudinal direction of the vehicle.

A further object of the present invention resides in a bumper for motor vehicles which does not involve relatively heavy and expensive structural parts to counteract the danger of canting or wedging of the shock absorbers used in the retractable suspension of the bumper.

A still further object of the present invention resides in a bumper for motor vehicles which can be equipped with conventional shock absorbers yet is operationally reliable in case of an impact regardless of the direction of the impact.

Still another object of the present invention resides in a bumper for motor vehicles which includes means in its connection with the body or frame of the vehicle by way of shock absorbers, that keep forces which are not directed in the axial direction of the shock absorbers far-reachingly from the shock absorbers.

Another object of the present invention resides in a bumper for motor vehicles connected with the body or frame of the vehicle by way of shock absorbers which not only assures a better moment introduction while eliminating the danger of a canting between piston shaft and guide tube of the shock absorbers but also permits a light weight construction of the various parts.

These and other objects, features and advantages of the present invention will become more apparent from the following description when taken in connection with the accompanying drawing which shows, for purposes of illustration only, one embodiment in accordance with the present invention, and wherein.

Figure 2:
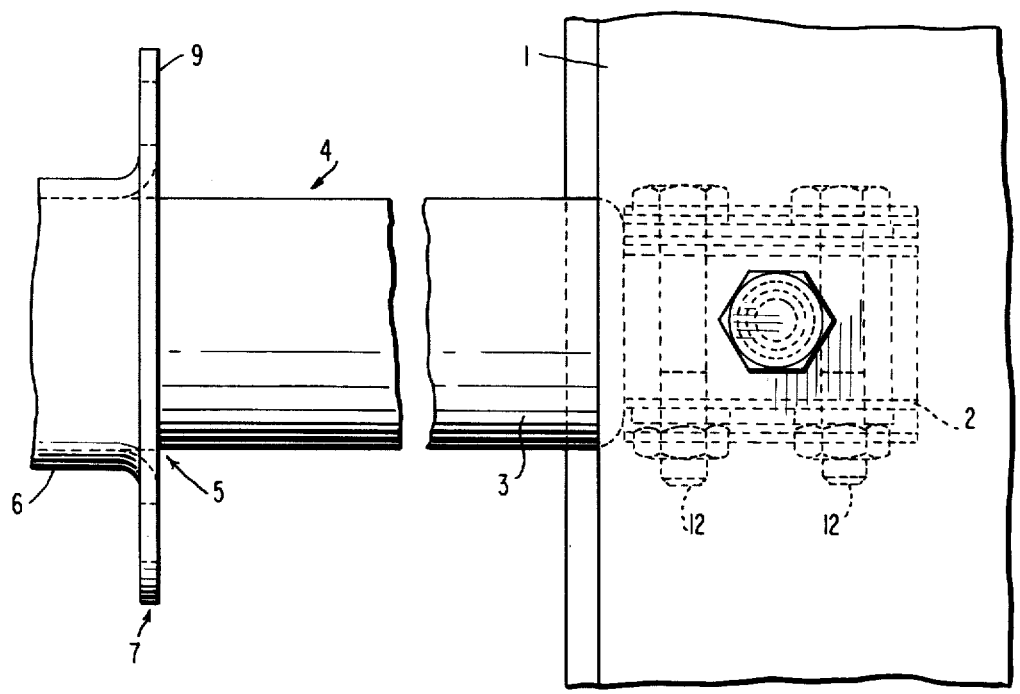
FIG. 2 is a partial plan view on FIG. 1.
Figure 3:
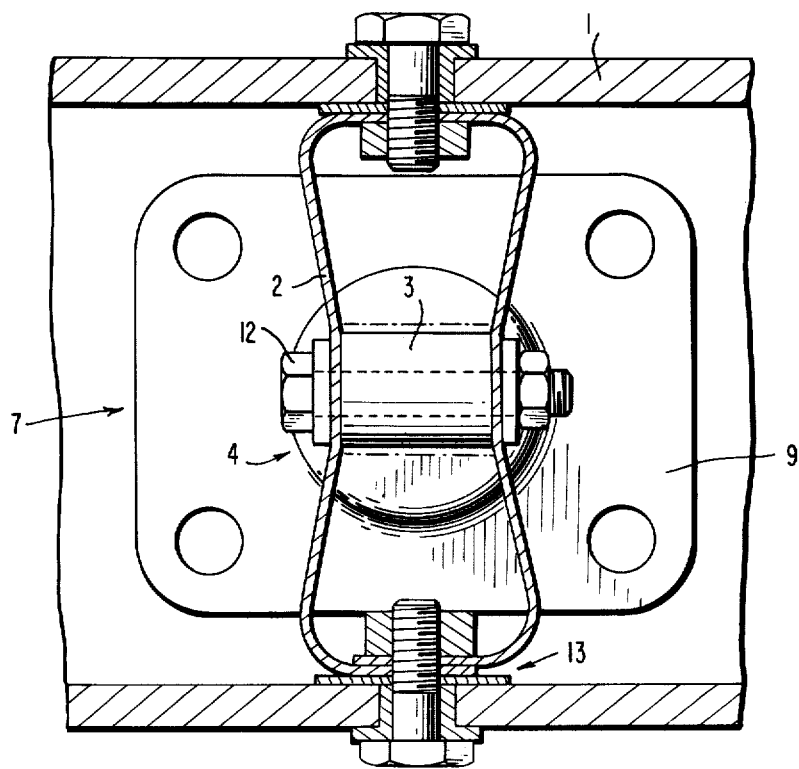
FIG. 3 is a front elevational view, partly in cross section of the fastening places of the bumper according to the present invention.

Referring now to the drawing wherein like reference numerals are used throughout the various views to designate like parts, a bumper 1 which for the protection against damages may be provided in a conventional manner with a bumper strip 20 consisting of elastic material and also with bumper guards 21, is supported at the forward end of the shock absorber shaft 3 of a shock absorber generally designated by reference numeral 4 by way of at least one flat spring 2 bent approximately in dipole shape, as can be seen best from FIG. 3. A fastening possibility generally designated by reference numeral 7 is provided in the open area generally designated by reference numeral 5 (FIGS. 1 and 2) of the shock absorber guide tube 6, by means of which the shock absorber 4 is connected with the body or frame generally designated by reference numeral 8—not illustrated in detail—of a motor vehicle.

Figure 1:
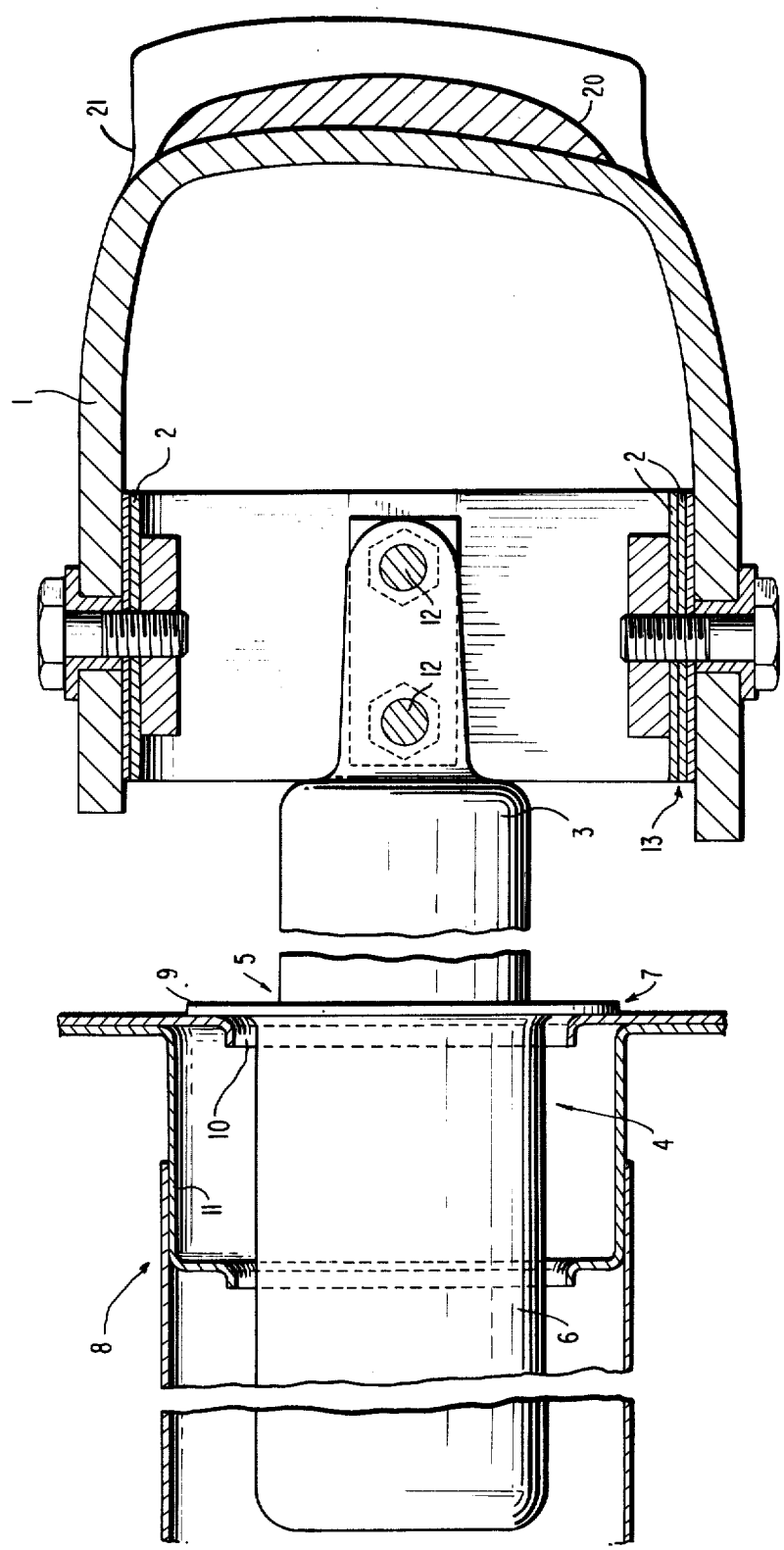
FIG. 1 is an elevational view, partly in cross section, of a bumper fastening arrangement according to the present invention.

In the illustrated embodiment, the fastening means 7 is constructed as flange 9 which is appropriately formed out of the shock absorber guide tube 6 and is received by an aperture 10 or an opening of a vehicle bearer 11 (FIG. 1). The fastening of the two near legs of the flat spring 2 at the forward end of the shock absorber shaft 3 takes place by way of a threaded connection 12 whereby—if necessary—a certain spring prestress can be achieved. The two remote legs of the flat spring 2 are detachably and movably connected in any conventional manner with the top and bottom side of the bumper 1, as shown in FIGS. 1 and 3, whereby the superposed starting- and end-area 13 of the flat spring 2 consisting of spring band is fixed simultaneously.

It is also possible to provide only one flat spring 2 for the absorption of cross forces. As a rule, no special measures have to be taken in order not to transmit the occurring cross displacement to the other shock absorber 4 since the cross displacement moves within very narrow limits and thus a canting of the shock absorber is not expected.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A bumper for motor vehicles which in case of impact is retractable under energy-absorption by means of shock absorber means extending generally in the vehicle longitudinal direction and fixedly connected with a relatively fixed vehicle part, characterized in that the mounting of the bumper means takes place at least at one shock absorber means having shafts and guide tube means and includes an approximately bipole shaped, substantially upright flat spring means yielding in the vehicle cross direction, and fastening means for the shock absorber means in the open area of the shock absorber guide tube means to provide a support at the fixed vehicle part.

2. A bumper according to claim 1, characterized in that the fastening means is constructed as a flange means formed out of the shock absorber guide tube means which is connected with the fixed vehicle part.

3. A bumper according to claim 2, characterized in that the fixed vehicle part is a vehicle bearer and in that the shock absorber means is inserted into an aperture means of the bearer means and is connected with the bearer means by way of the flange means.

4. A bumper according to claim 3, characterized in that the substantially upright flat spring means includes a first and second pair of leg portions and in that the bumper means includes a top and bottom side, the first pair of leg portions are held in abutment at the forward end of the shock absorber shaft means and the second pair of leg portions are detachably connected with the top and bottom side of the bumper means.

5. A bumper according to claim 4, characterized in that the abutment of the first pair of leg portions at the forward end of the shock absorber shaft means takes place by threaded connections.

6. A bumper according to claim 4, characterized in that the flat spring means consists of a spring band whose superimposed starting and end area is fixed simultaneously with the fastening of the flat spring means at the bumper means.

7. A bumper according to claim 6, characterized in that the bumper is provided with an elastic bumper strip.

8. A bumper according to claim 7, characterized in that the bumper means is provided with bumper guards.

9. A bumper according to claim 8, characterized in that the abutment of the first pair of leg portions at the forward end of the shock absorber shaft means takes place by threaded connections.

10. A bumper according to claim 9, characterized in that the bumper is for passenger motor vehicles.

11. A bumper according to claim 1, characterized in that the substantially upright flat spring means includes a first and second pair of leg portions and in that the bumper means includes a top and bottom side, the first pair of leg portions are held in abutment at the forward end of the shock absorber shaft means and the second pair of leg portions are detachably connected with the top and bottom side of the bumper means.

12. A bumper according to claim 11, characterized in that the abutment of the first pair of leg portions at the forward end of the shock absorber shaft means takes place by threaded connections.

13. A bumper according to claim 1, characterized in that the flat spring means consists of a spring band whose superimposed starting and end area is fixed simultaneously with the fastening of the flat spring means at the bumper means.

14. A bumper according to claim 1, characterized in that the bumper is provided with an elastic bumper strip.

15. A bumper according to claim 1, characterized in that the bumper means is provided with bumper guards.

16. A bumper according to claim 15, characterized in that the bumper is provided with an elastic bumper strip.

* * * * *